UNITED STATES PATENT OFFICE.

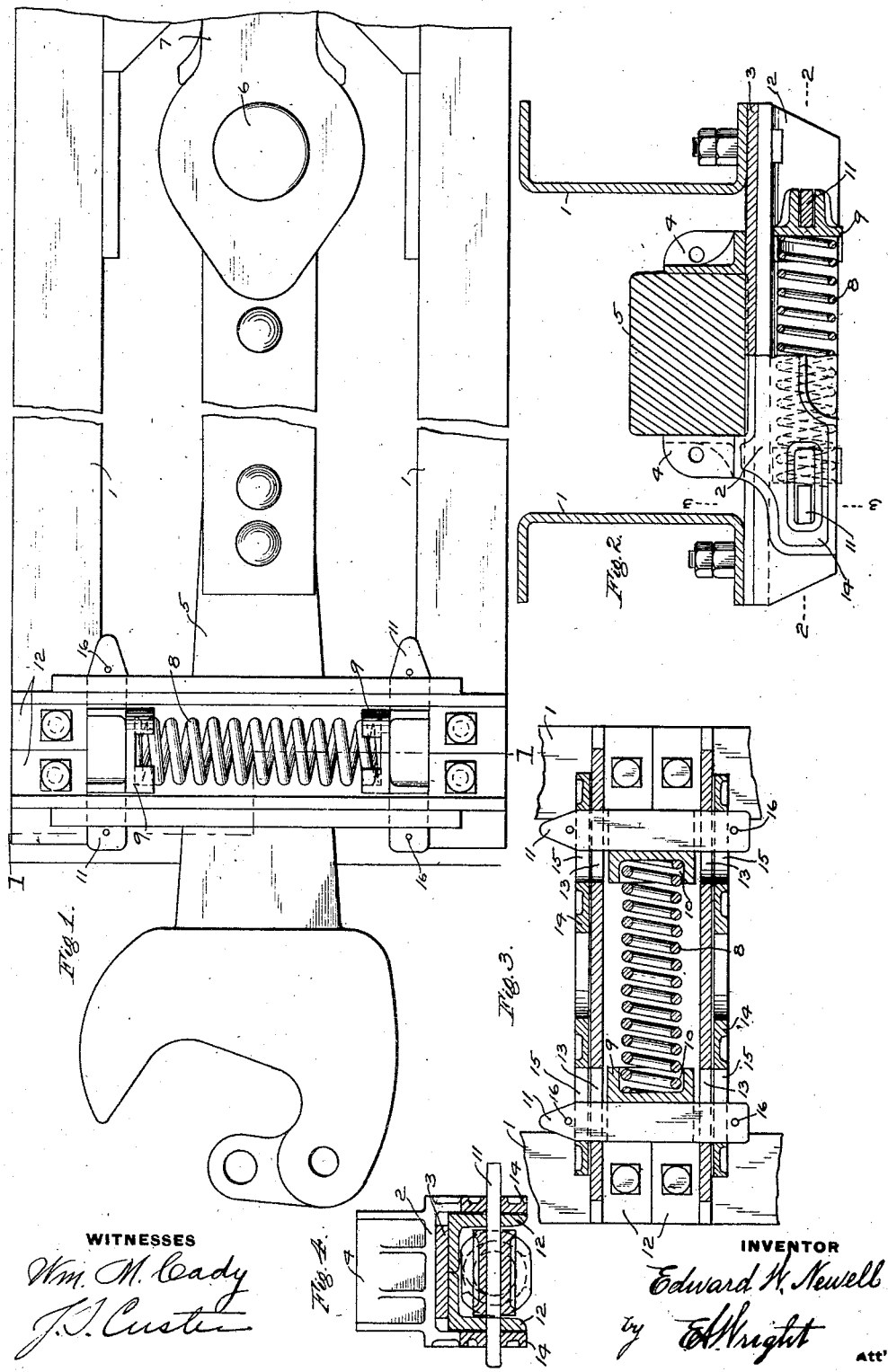

EDWARD W. NEWELL, OF PITTSBURG, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

COUPLING-CENTERING DEVICE.

1,004,064.      Specification of Letters Patent.    Patented Sept. 26, 1911.

Application filed August 27, 1907. Serial No. 390,297.

*To all whom it may concern:*

Be it known that I, EDWARD W. NEWELL, a citizen of the United States, residing at Pittsburg, in the county of Allegheny and State of Pennsylvania, have invented new and useful Improvements in Coupler-Centering Devices, of which the following is a specification.

My invention relates to coupler centering devices, by which the coupler or its draw bar, while permitted to move laterally from side to side, is automatically restored to its central position.

The principal object of my invention is to provide an improved coupler centering device of few parts, simple in construction, and which may be readily assembled or taken apart.

Another object is to provide improved means, in a device of this character, for securing an initial compression in the centering spring.

In the accompanying drawing, Figure 1 is a bottom plan view of a part of a car underframe, with a preferred form of my invention applied; Fig. 2 a transverse sectional view, in part, on the line 1—1 of Fig. 1; Fig. 3 a section taken on the line 2—2 of Fig. 2, and Fig. 4 a section taken on line 3—3 of Fig. 2.

According to the drawing, my invention is illustrated as applied to the steel underframe of a car, having center sills 1, and comprises a saddle 2, slidably mounted on a plate 3, secured to the under flanges of the center sills 1, preferably adjacent to face of the end sill. The saddle 2 has upwardly extending guide lugs 4, between which the coupler shank 5, having a pivot bearing 6 in the yoke 7, is carried. The coupler shank 5, and saddle 2 are yieldingly held in the central position by a centering spring 8, which is maintained in place by keys 11, passing through slots in spring followers 9, preferably provided with recesses 10 for the reception of the opposite ends of the spring 8.

Angle iron guides 12, secured to the under face of the plate 3, have slots 13 near each end for the keys 11, and the saddle 2 is provided with downwardly extending guide lugs 14, having slots 15, which are adapted to register with the slots 13 in the angles 12, so that the slots in the spring followers, with the centering spring in place, may be alined with the slots in the angles and saddle, and the keys 11 inserted, thereby securing the parts in position. The keys may be tapered at the ends, so that they can be more readily driven into place and may be provided with holes 16 for cotter pins, to prevent the keys from accidentally dropping out.

The spring 8 is preferably of such length, that when the keys 11 are in position, it will be under compression, thereby providing an initial compression, which is desirable, in order to secure a more positive movement of the coupler up to its central position.

When the coupler shank moves from its central position, the saddle engages one of the keys 11 and shifts it inwardly, in the slots 13 and 15, compressing the centering spring 8, the opposite key being held from movement in the same direction by the angles 12.

When the coupler is free to return to its central position, the spring 8 exerts its force against the key and thereby returns the saddle and coupler to their central position.

Having now described my invention, what I claim as new and desire to secure by Letters Patent is:—

1. The combination with a laterally movable coupler draw-bar, of a saddle in which the draw-bar is carried, a spring for centering the saddle and draw-bar, follower plates at opposite ends of the spring, and removable keys interposed between the follower plates and the saddle for maintaining the parts in position.

2. The combination with a laterally movable coupler draw-bar, of a saddle in which the draw-bar is carried, a spring for centering the saddle and draw-bar, followers for the spring provided with slots, and removable keys inserted in the slots of the followers and slots in the saddle for maintaining the parts in place.

3. A coupler centering device comprising a saddle for carrying the coupler shank, a centering spring adapted to be compressed upon movement of said saddle from its central position, and longitudinally removable keys for holding said spring in position under initial compression.

In testimony whereof I have hereunto set my hand.

EDWARD W. NEWELL.

Witnesses:
R. F. EMERY,
WM. M. CADY.